(12) United States Patent
Park et al.

(10) Patent No.: US 6,214,227 B1
(45) Date of Patent: *Apr. 10, 2001

(54) CERAMIC FILTER MODULE

(75) Inventors: Jin-Joo Park; Chihiro Kawai, both of Itami (JP)

(73) Assignee: Sumitomo Electric Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,605

(22) Filed: Aug. 14, 1998

(30) Foreign Application Priority Data

Aug. 20, 1997 (JP) .................................................. 9-223939
Jul. 14, 1998 (JP) .................................................. 10-198811

(51) Int. Cl.⁷ .................................................. B01D 39/00
(52) U.S. Cl. .................................... 210/510.1; 210/433.1; 55/523; 502/527.21; 502/527.18; 502/527.19; 501/97.1
(58) Field of Search ..................... 210/483, 488, 210/489, 490, 498, 506, 496, 510.1, 433.1, 502.1; 55/522, 523, 524; 502/527.11, 527.18, 527.19, 527.21, 200, 439; 501/97.1

(56) References Cited

U.S. PATENT DOCUMENTS 5,750,026 * 5/1998 Gadkaree et al. ............ 210/502.1
5,846,460   12/1998 Matsuura et al. .

FOREIGN PATENT DOCUMENTS

| 681 281 A5 | 2/1993 | (CH) . |
| 0 653 392 A1 | 5/1995 | (EP) . |
| 4-892 | 1/1992 | (JP) . |
| 4-893 | 1/1992 | (JP) . |
| 9-100179 | 4/1997 | (JP) . |
| WO 94/27929 | 12/1994 | (WO) . |

* cited by examiner

Primary Examiner—W. L. Walker
Assistant Examiner—Terry Cecil
(74) Attorney, Agent, or Firm—McDermott, Will & Emery

(57) ABSTRACT

A ceramic filter module includes a plurality of passage holes (11) and internal passage holes (12) alternately arranged about a plurality of ceramic partitions (15). The internal passage holes are sealed at each end by seals (13). The partitions are at most 1 mm thick and allow fluid to be filtered as the fluid flows from passage holes (11) to the internal passage holes (12). A plurality of discharge holes (14) traversing through the ceramic partitions between adjacent internal passage holes or between an internal passage hole and an outer surface allow the permeate to exit. The module is a porous ceramic body that preferably has an average pore diameter of 1 $\mu$m and is composed of silicon nitride. The ceramic filter module has the advantages of low permeation resistance and very high permeability.

4 Claims, 5 Drawing Sheets

CERAMIC FILTER MODULE

BACKGROUND OF THE INVENTION

1. Field of the Invention

The present invention relates to a ceramic filter module for a fluid permeation filter, and more particularly to a silicon nitride filter module having high permeability.

2. Description of the Prior Art

Organic membranes have hitherto been used as a filter in the field of the production of foods, chemicals and semiconductors. Since, however, the organic membranes have poor heat resistance, pressure resistance, and chemical resistance, filters made of porous ceramic membranes which are excellent in the above properties have been substituted for the organic membranes. The porous ceramic membranes have also been used as a catalyst carrier, a bioreactor such as a microorganism cultivation carrier, and the like.

Further, in recent years, there is an ever-increasing demand for ceramic filters having high heat resistance, high strength, and high permeability. Among various ceramics, silicon nitride is a structural ceramic material having high strength, high toughness, high thermal shock resistance, and high chemical resistance and hence is a very promising filter material.

The efficiency of filtering of the ceramic filter is proportionally related to the porosity at constant pore diameter and inversely related to the pore diameter at constant porosity.

A conventional ceramic filter typified by $Al_2O_3$ comprises a porous ceramic body prepared by sintering a raw material powder and hence has a low porosity, that is, a porosity of about 40% by volume at the highest. This leads to high pressure loss at the time of filtration, and the permeability is inferior to that of the organic membrane.

In order to eliminate the above drawback, an actual ceramic filter is designed so that a porous ceramic body is prepared in a tubular form having a multi-layer structure to reduce the thickness of the porous body in its small-diameter pore portions necessary for actual filtration, thereby lowering the pressure loss, thus increasing the permeability. More specifically, the ceramic filter has a multi-layer structure composed of two or three layers comprising a tubular thin layer section involved in actual filtration, a substrate section for supporting the thin layer section, and optionally an intermediate section interposed between the thin layer section and the substrate section.

When use of the ceramic filter on a commercial scale is contemplated, the membrane area per unit volume should be increased in order to render filtration equipment compact. This is because the performance of the filter is proportional to the product of the flow rate of permeation per unit area and the membrane area. The form of a filter developed for this purpose is a monolithic form. As shown in FIG. 8, this filter is in the form of a filter module 1 having a structure in a lotus root form in section wherein a large number of passage holes 3 for a feed fluid are provided in a porous ceramic body 2. Also in this monolithic form, as with the above filter, in order to increase the permeability, each passage hole 3 (referred to also as cell) has a multi-layer structure comprising a thin layer section, which has a small pore diameter and serves as a-filtration layer, and a substrate section having a large pore diameter for supporting the thin layer section.

The above monolithic filter module 1 has been extensively used for cross-flow filtration generally used in the production processes for foods and chemicals. In this filtration system, as shown in FIG. 9, a feed fluid 5 is poured from a stock solution tank 4 through a feed pump 6 into a monolithic filter module 1, and the permeate is withdrawn and recovered from the filter module 1, while the feed fluid 5 passing through the passage holes of the filter module 1 is returned through a circulation path 7 to the stock solution tank 4 and repeatedly flowed for filtration.

As described above, the conventional ceramic filter is in a tubular form having a multi-layer structure comprising a cylindrical thin layer section involved in filtration and a substrate section for supporting the thin layer section in order to lower the pressure loss and improve the permeability. In actual filtration equipment, use is made of a monolithic filter module having a multi-layer structure wherein the passage holes are formed in a lotus root form.

Since, however, a multi-layer structure of the lotus rootlike passage holes in the monolithic filter cannot be prepared without resort to complicated steps, the production cost is inevitably increased unfavorably.

Meanwhile, a porous silicon nitride ceramic body having high porosity, high strength, and very high flow rate of permeation has been proposed in WO 94/27929, published Dec. 8, 1994. The porous silicon nitride body has a structure wherein columnar $Si_3N_4$ particles as the main component are three-dimensionally and randomly bonded to one another. The porous body has a porosity of at least 30% and, unlike the conventional ceramic filter of $Al_2O_3$ or the like, satisfactorily large flow rate of permeation can be provided without adopting a multi-layer structure.

Even in this porous silicon nitride ceramic body having a single-layer structure, use thereof as a monolithic filter module results in markedly lowered permeability, although the porous filter in the form of a tubular filter has higher permeability than the conventional $Al_2O_3$ filter with a multilayer structure.

The reason for this is as follows. In the monolithic filter having a single-layer structure, when the permeate passes from passage holes 3 near the center of the filter toward the circumferential surface through the ceramic body as indicated by an arrow in FIG. 8, the distances between the passage holes 3 near the center of the filter and the circumferential surface of the filter are large. This results in very large permeation resistance, and the actual permeability is substantially determined by the flow rate of permeation from the passage holes 3 near the surface of the filter.

SUMMARY OF THE INVENTION

In view of the above circumstances of the prior art, it is an object of the present invention to provide a monolithic ceramic filter module that has low permeation resistance and very high permeability, and more particularly to provide a ceramic filter module that has high heat resistance, high strength, and high separation performance and permeability and is suitable in cross-flow filtration, microfiltration, ultrafiltration and the like used in the preparation of foods, chemicals and semiconductors.

According to the present invention, the above object can be attained by a ceramic filter module comprising a large number of passage holes provided so as to pass through a porous ceramic body in one direction for permitting a feed fluid to flow therethrough, and a large number of internal passage holes which are provided by sealing the inlet and the outlet of a part of the passage holes for permitting the permeate to flow therethrough, the passage holes and the internal passage holes being alternately arranged in rows or columns in a cross section normal to the one direction, a large number of discharge holes for the permeate being provided through each ceramic partition between the adjacent internal passage holes and/or between the internal passage hole and the circumferential surface of the porous ceramic body.

Throughout the specification, a fluid which flows in the passage holes to be subjected to filtration, and a fluid, which has been filtered or passes through the ceramic partition and flows into the internal passage holes, are referred to as "a feed fluid" and "the permeate", respectively.

According to the ceramic filter module of the present invention, particularly preferable the porous ceramic body is a porous silicon nitride ceramic body which is constituted of columnar silicon nitride particles having an average aspect ratio (i.e., ratio of the length in the major axis to the diameter in the minor axis) of at least 3 and an oxide binder phase and has a porosity of 30 to 70%, an average pore diameter of 12 µm or less, and a three-point flexural strength of at least 100 MPa.

DETAILED DESCRIPTION OF THE PREFERRED EMBODIMENTS

Figure 1:
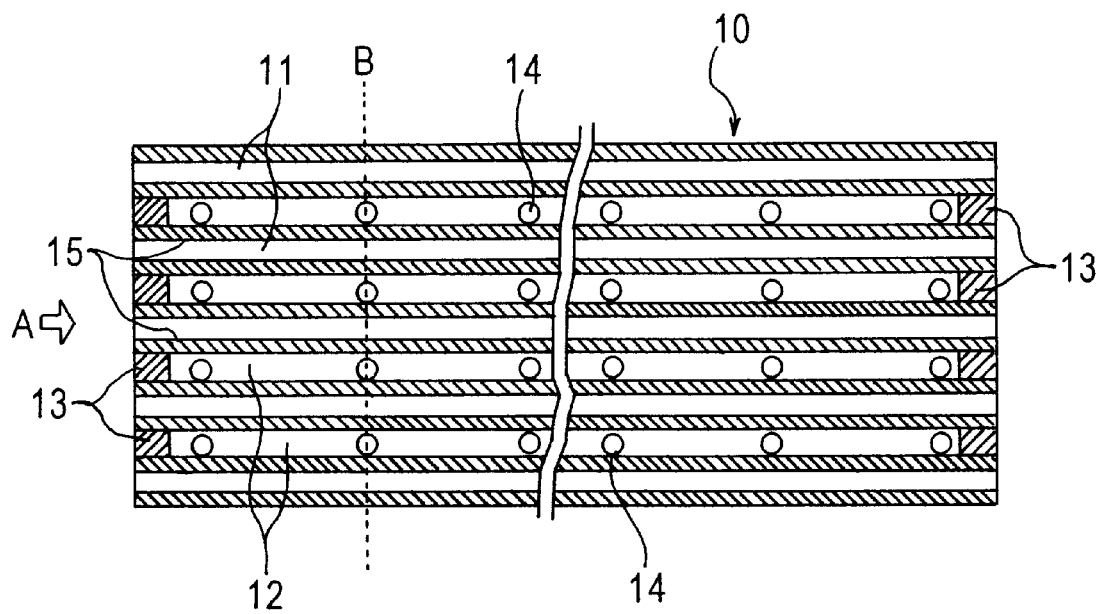
FIG. 1 is a sectional view of the side of a ceramic filter module shown as an embodiment according to the present invention.
Figure 2:
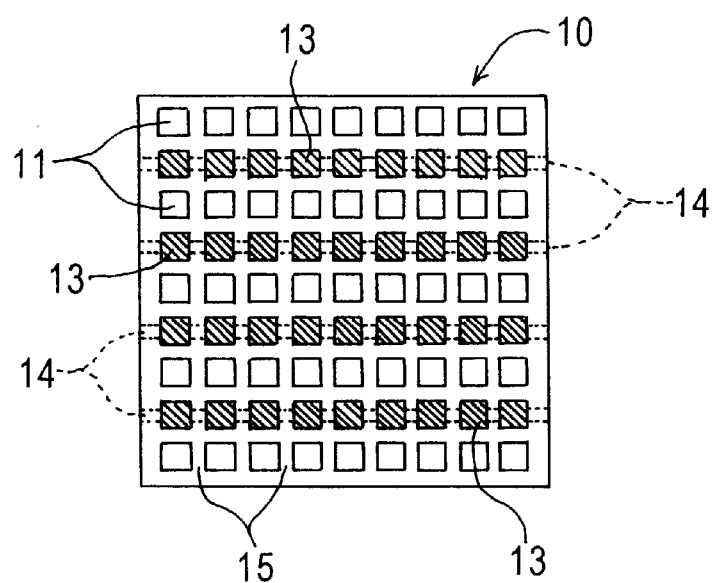
FIG. 2 is a front view as viewed from the direction A of the ceramic filter module shown in FIG. 1.

An example of the ceramic filter module of the present invention is, as shown in FIGS. 1 and 2, in a monolithic form comprising a porous ceramic body 10 and a large number of passage holes 11 for passage of a feed fluid, in a lotus root form or a honeycomb form provided so as to pass through the porous ceramic body 10 in one direction. In this case the inlets and the outlets of some of the passage holes 11 are sealed by means of a sealing section 13 to provide internal passage holes 12 with both ends being sealed. The passage holes 11 and the internal passage holes 12 are, for example as shown in FIG. 2, alternately arranged in rows or columns as viewed from a section normal to the through direction.

Figure 3:
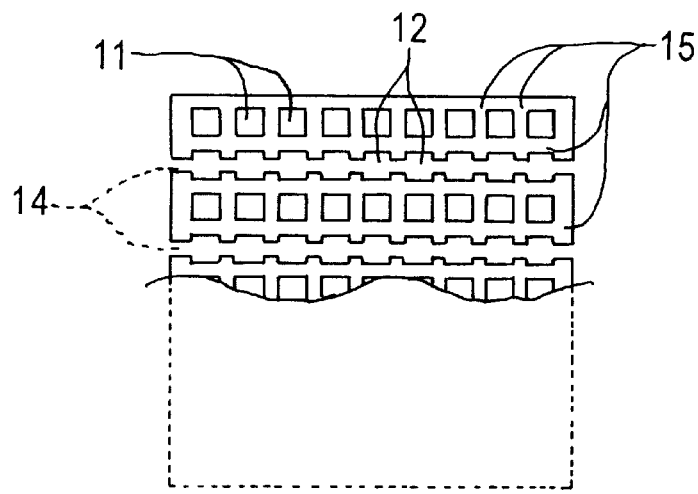
FIG. 3 is a cross-sectional view along the line B of the ceramic filter module shown in FIG. 1.
Figure 4:
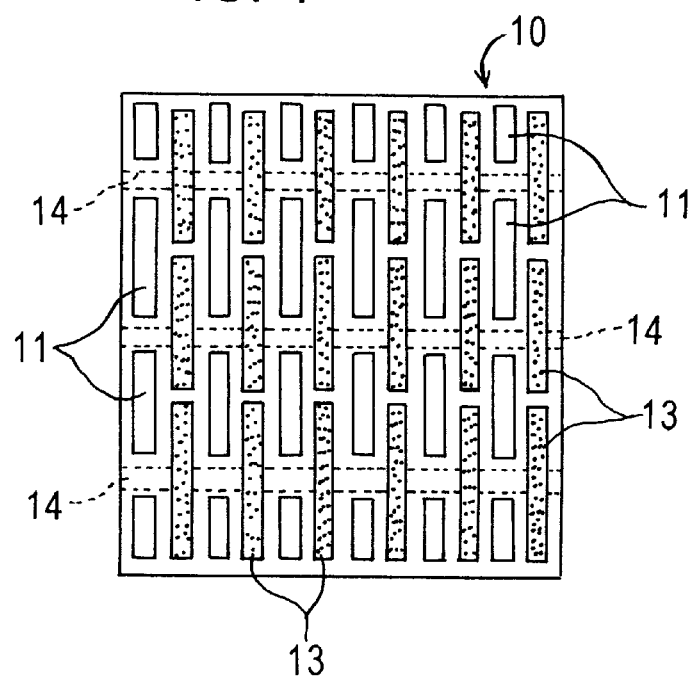
FIG. 4 is a front view showing another embodiment of the ceramic filter module according to the present invention.

Further, as shown in FIGS. 2 and 3, a large number of discharge holes 14 for the permeate are provided through a ceramic partition 15 between adjacent internal passage holes 12 among the large number of the internal passage holes 12 alternately arranged in rows or columns and/or between the internal passage hole 12 and the circumferential surface of the porous ceramic body 10. That is, these discharge holes 14 passing through the ceramic partition 15 of the porous ceramic body 10 present between the internal passage holes 12 arranged in rows or columns permit the internal passage holes 12 to communicate with one other and in addition to be open to the circumferential surface of the porous ceramic body 10.

Regarding each discharge hole 14 in any row or column, provision of at least two such holes for each internal passage hole 12 suffices for permitting all the internal passage holes 12 to communicate with one another and to be open to the circumferential surface of the porous ceramic body 10. However, provision of at least three discharge holes 14 for each internal passage hole 12 is preferred for facilitating the discharge of the permeate.

Figure 5:
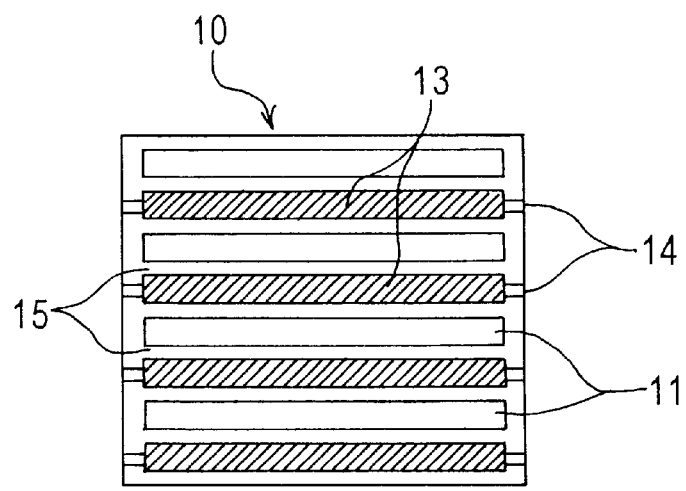
FIG. 5 is a front view showing a further embodiment of the ceramic filter module according to the present invention.
Figure 6:
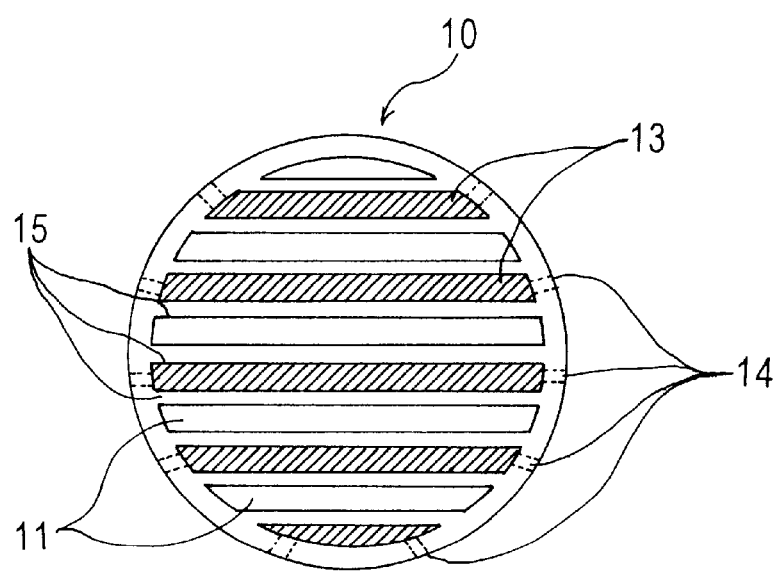
FIG. 6 is a front view showing a still further embodiment of the ceramic filter module according to the present invention, which is formed in a circular form in section.

The sectional form of the passage hole 11 and that of the internal passage hole 12 are not particularly limited and, in addition to the square shown in FIGS. 1 and 2, triangular, quadrangular, hexagonal, circular, grid-like and slit-like forms are also possible. For example, the passage hole 11 and the internal passage hole 12 may be formed in a rectangle form having different side lengths (shown in FIG. 4), a grid-like form (shown in FIG. 5) or a slit-like form (shown in FIG. 6), in section. In this invention, the sectional forms of passage holes and internal passage holes shown in FIG. 5 and FIG. 6 are referred to "a grid-like form" and "a slit-like form", respectively. Further, the sectional form of the porous ceramic body 10 constituting the filter module may be a circular (FIG. 6) or polygonal form besides the quadrangular form as shown in FIGS. 2, 3, 4 and 5.

The sealing section 13 in the internal passage hole 12 may be made of metal or ceramic besides plastic such as an epoxy resin or a fluororesin. In the case of a ceramic sealing section, the sealing section may be sintered simultaneously with the sintering of the porous ceramic body.

The ceramic filter module having the above structure may be prepared, as practiced in a conventional method, by molding raw material powders by extrusion or the like into a molding in a lotus root or honeycomb form and then sintering the molding to form a porous ceramic body-with a large number of passage holes provided therein. Next, both ends of the passage hole are sealed in every other row or column to form internal passage holes, and discharge holes are provided in the internal passage holes in the sealed row or column so as to pass through the ceramic partition between the internal passage holes. The above preparation method is a mere example, and it is also possible to form discharge holes at the time of molding or to seal both ends of the internal passage holes simultaneously with sintering.

According to the ceramic filter module according to the present invention, the feed fluid poured into one end face of the filter module flows into passage holes (cells) open to the end face in every row or every column. A part of the feed fluid which has flowed into the passage holes permeates through the ceramic partition(cell wall) of the porous ceramic body and enters internal passage holes arranged in the adjacent row or column. The permeate, which has entered the internal passage holes in such a way, flows through the internal passage holes and then directly discharged outside the filter module or is moved to adjacent internal passage holes, through discharge holes. This step is repeated and finally the permeate flows through the discharge holes into the circumferential surface of the filter module and is discharged outside the filter module.

Thus, the permeate freely flows through the internal passage holes adjacent to the passage holes and at the same time is discharged through the discharge holes outside the filter module. Therefore, even in permeation from the passage holes in the interior of the porous ceramic body, particularly permeation from the passage holes near the center of the porous ceramic body, no large permeation resistance is created. Therefore, despite the monolithic ceramic filter module, very high permeability can be realized. Further, unlike the conventional ceramic filter of $Al_2O_3$ or the like, satisfactory large flow rate of permeation can be provided without adopting a multi-layer cell wall structure comprising a thin layer section and a supporting section.

The porous ceramic body is particularly preferably a porous silicon nitride ceramic body which is constituted of columnar silicon nitride particles having an average aspect ratio of at least 3 and an oxide binder phase and has a porosity of 30 to 70%, an average pore diameter of 12 μm or less, and a three-point flexural strength of at least 100 MPa. Use of this porous silicon nitride ceramic body can provide a ceramic filter module that has high strength, excellent heat resistance, pressure resistance and other properties, and excellent permeability and separation performance. The silicon nitride ceramic includes sialon.

This porous silicon nitride ceramic body is described in detail in Japanese Patent Application No. 500470/1995. Specifically, the porous silicon nitride ceramic body comprises a columnar silicon nitride having an aspect ratio of at least 3 as the main component, at least one rare earth element compound in an amount of 1 to 20% by volume in terms of oxide, and optionally at least one selected from the group consisting of compounds of group 2A and 3B elements of the periodic table and transition metal elements in an amount of at most 5% by volume in terms of oxide. In this case, at least 60% of all the silicon nitride particles are accounted for by β-silicon nitride particles having an aspect ratio of at least 3.

The porous silicon nitride ceramic body can be prepared by a method which comprises: mixing an $Si_3N_4$ powder with rare earth element compound powder(s) as the raw material and optionally other compound powder(s) together, molding the mixture by a conventional molding method, and heat-treating the molding in a nitrogen-containing inert atmosphere at a temperature of 1500 to 2100° C. The density of the molding is preferably 30 to 60% of the theoretical density from the viewpoint of providing predetermined porosity and pore diameter. The average pore diameter can be regulated by the particle size of the raw material powders and the density of the molding.

The reason why this porous silicon nitride ceramic body has very high permeability is that (1) unlike the conventional porous $Al_2O_3$ body having a porosity of as small as about 40% at the highest, the porous silicon nitride ceramic body has a porosity of as high as 30 to 70% or more, generally about 50%, and (2) the porous $Al_2O_3$ body has circular pores, whereas the porous silicon nitride ceramic body has pores in a slit form.

Further, as described above, the pores in the porous silicon nitride ceramic body are in a slit form. Therefore, particles having sizes much smaller than the maximum pore diameter of the filter as measured by mercury porosimetry, specifically particles having a size of about one-fifth of the maximum pore diameter of the filter, can be separated by filtration. On the other hand, the size of the particles which can be separated by the conventional $Al_2O_3$ filter is approximately equal to the maximum pore diameter of the filter. Furthermore, porous bodies having a small average pore diameter of down to 0.004 μm can be prepared. A porous body which is highly desired is one having an average pore diameter of at most 1 μm.

Figure 7:
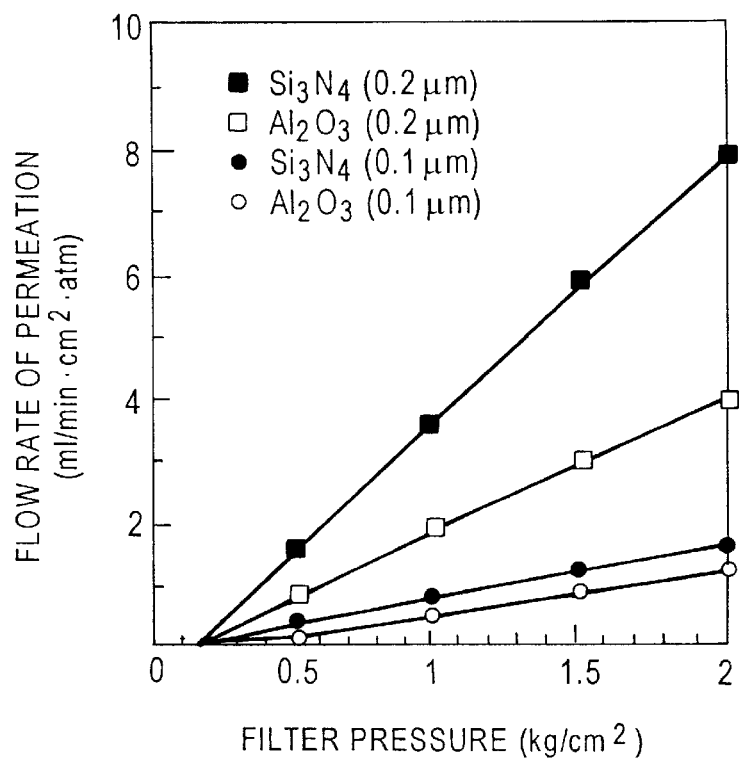
FIG. 7 is a graph showing the relationship between the filtration pressure and the flow rate of permeation for four ceramic filter modules.
Figure 8:
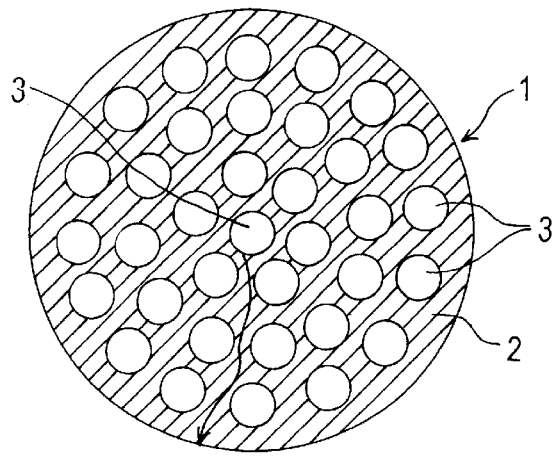
FIG. 8 is a cross-sectional view of a conventional monolithic ceramic filer.
Figure 9:
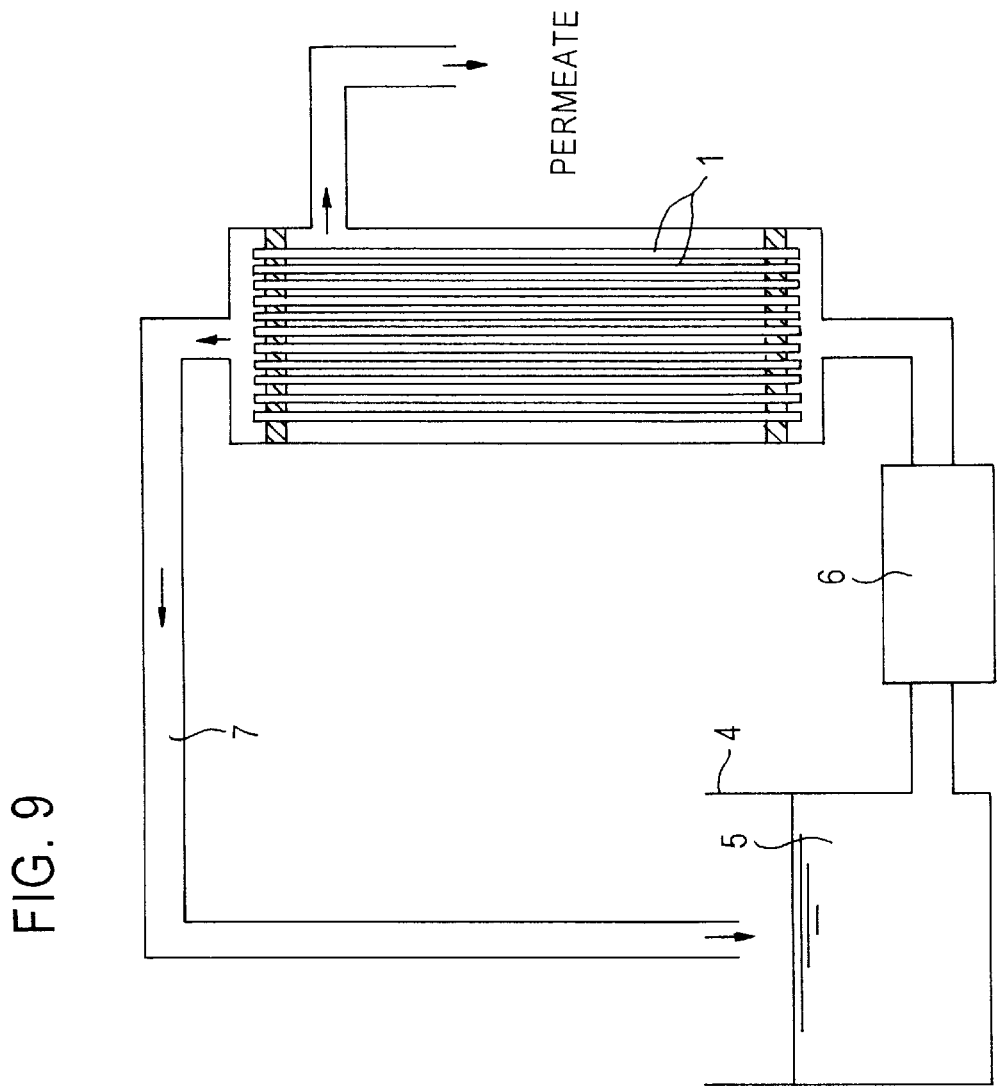
FIG. 9 is a schematic explanatory view of a cross-flow filtration system.

Thus, the construction of the filter module of the present invention using the above porous silicon nitride ceramic body can provide a ceramic filter that has very high permeability and at the same time has excellent separation performance. This can be understood also from FIG. 7 showing a comparison of the permeability of a tubular $Al_2O_3$ filter (outer diameter: 10 mm, inner diameter: 8.5 mm, and length: 100 mm), of which the cell wall has a multi-layer structure, with the permeability of a tubular, single-layer $Si_3N_4$ filter (outer diameter: 10 mm, inner diameter: 8 mm, and length: 100 mm) according to the present invention. In FIG. 7, the minimum size of particles which can be separated by filtration through the ceramic partition of the filter is shown within parentheses following the filter material.

When the filter module according to the present invention comprises a porous silicon nitride ceramic body, the thickness of the ceramic partition(cell wall) between the passage holes and the internal passage holes is preferably at most 1 mm because a thickness exceeding 1 mm leads to increased permeation resistance and hence deteriorates the permeability. When the passage holes and the internal passage holes are alternately arranged in rows or columns, the pitch (distance) between the rows or columns is preferably 1 to 3 mm from the viewpoint of providing necessary strength and separation performance while maintaining excellent permeability.

EXAMPLES

An $Si_3N_4$ filter module ① having a structure shown in FIGS. 1 and 2 and an $Al_2O_3$ filter module ② having a structure shown in FIGS. 1 and 2 with the cell wall having a three-layer structure were prepared as follows and subjected to a permeability test. For comparison, a commercially available monolithic $Al_2O_3$ filter module ③ with the cell wall having a three-layer structure was also subjected to the permeability test.

① $Si_3N_4$ filter module:

8% by weight of a $Y_2O_3$ powder having an average particle size of 0.025 μm was added to an α-$Si_3N_4$ powder having an average particle size of 0.5 μm. The mixed powders were mixed with an organic binder and water, and the mixture was extruded. The extrudate was fired in a nitrogen atmosphere at a temperature of 1800° C. and a pressure of 5 atm for 2 hr. Among passage holes 11 of the resultant porous $Si_3N_4$ ceramic body 10, both ends of the passage holes in every other column were sealed with a fluororesin to form internal passage holes 12, and discharge holes 14 were provided so that the internal passage holes 12 communicated with one another and were open to the outside.

The filter module thus prepared having a structure shown in FIGS. 1 and 2 had a square pole cylindrical shape having a size of 30.6 mm in both width and height and 500 mm in length. The passage holes 11 and the internal passage holes 12 were 2 mm in both width and height. The thickness of the ceramic partition between the passage holes 11, between the internal passage holes 12, or between the passage hole 11 and the internal passage hole 12 was 0.3 mm, and the thickness of the ceramic partition between the passage hole 11 or the internal passage hole 12 and the circumferential surface was 0.5 mm. The discharge holes 14 had a diameter of 1.5 mm and were provided at intervals of 50 mm. This $Si_3N_4$ filter module had a ceramic partition having a porosity of 50%, and all (100%) of particles having a particle size of 0.2 μm could be separated.

② $Al_2O_3$ filter module:

Supporting layer: 0.5% by weight of an MgO powder having an average particle size of 0.5 μm was added to an α-$Al_2O_3$ powder having an average particle size of 20 μm. The mixed powders were mixed with an organic binder and water, and the mixture was extruded. The extrudate was fired in air at a temperature of 1200° C. and a pressure of 1 atm for 2 hr. Thus, a structure (a supporting layer) having the same shape and dimensions as the $Si_3N_4$ filter module ① was prepared.

Intermediate layer: 0.5% by weight of an MgO powder having an average particle size of 0.5 μm was added to an α-$Al_2O_3$ powder having an average particle size of 1 μm. Water was added to the mixed powders to prepare a 20% slurry. The slurry was filtered through the above structure (supporting layer), followed by firing in the same manner as described above to form an intermediate layer on the wall of the passage hole.

Filtration layer: 0.5% by weight of an MgO powder having an average particle size of 0.05 μm was added to an α-$Al_2O_3$ powder having an average particle size of 0.2 μm. Water was added to the mixed powders to prepare a 20% slurry. The slurry was filtered through the above structure provided with the intermediate layer, followed by firing in the same manner as described above to form a filtration layer on the wall of the passage hole.

Thereafter, in the same manner as described above in connection with the $Si_3N_4$ filter module ①, both ends of a part of the passage holes were sealed to form internal passage holes, and discharge holes were further provided. The $Al_2O_3$ filter module had a porosity of 35% at the ceramic partition thereof, and all (100%) of particles having a particle size of 0.2 μm could be separated.

③ Commercially available monolithic $Al_2O_3$ filter module:

This filter module had such a structure that 37 passage holes having a diameter of 3 mm were bored in a porous $Al_2O_3$ ceramic body having a length of 500 mm and a diameter of 30 mm. As with the passage holes in the $Al_2O_3$ filter module ②, each passage hole had a multi-layer structure of a supporting layer, an intermediate layer, and a filtration layer. This commercially available monolithic $Al_2O_3$ filter module had a porosity of 35% at the ceramic partition, and particles having a particle size of 0.2 μm were all (100%) separated.

For the filter modules ①, ②, and ③, the maximum pore diameter and the thickness of the ceramic partition are summarized in Table 1.

TABLE 1

| | Supporting layer | | Intermediate layer | | Filtration layer | | Ceramic partition |
|---|---|---|---|---|---|---|---|
| Filter | Pore diameter (μm) | Thickness (μm) | Pore diameter (μm) | Thickness (μm) | Pore diameter (μm) | Thickness (μm) | Total thickness (μm) |
| ① $Si_3N_4$ | none | none | None | none | 1.0 | 300 | 300 |
| ② $Al_2O_3$ | 10.5 | 300 | 0.5 | 140 | 0.2 | 80 | 520 |
| ③ Commercially available $Al_2O_3$ | 10 | — | 0.5 | 140 | 0.2 | 80 | — |

In the permeability test of the filter modules ①, ②, and ①, pure water containing $Al_2O_3$ particles having a particle size of 0.2 μm in an amount of 0.1% by weight was filtered and the flow rate of permeation was measured. The results are given in Table 2. The filtration was conducted under conditions of a pressure difference of 1 kg/cm² and a flow rate of the feed fluid of 30 liters/minute. As is apparent from the results given in Table 2, the ceramic filter module having a structure shown in FIGS. 1 and 2 according to the present invention had better permeability than the conventional, commercially available monolithic ceramic filter module. In particular, it should be noted that the $Si_3N_4$ filter module had much superior permeability despite the fact that the module was of monolithic type and the cell wall did not have a multi-layer structure.

TABLE 2

| Filter | Size of particles filtered out (μm) | Flow rate of permeation (liter/min) |
|---|---|---|
| ① $Si_3N_4$ | 0.2 | 22.0 |
| ② $Al_2O_3$ | 0.2 | 4.28 |
| ③ Commercially available $Al_2O_3$ | 0.2 | 2.33 |

The present invention can provide a monolithic ceramic filter module that has low permeation resistance and very high permeability. Further, use of a porous silicon nitride body can provide a filter module that has high heat resistance, high strength, and better separation performance and permeability.

Since the ceramic filter module according to the present invention has both high separation performance and high permeability, it is useful as a filter for various types of filtration, including cross-flow filtration, microfiltration, and ultrafiltration used in the production of foods, chemicals and semiconductors. Furthermore, formation of a layer having a smaller pore diameter on the inner wall renders the filter module useful as a filter usable not only for filtration of liquids but also for separation of gases and other purpose.

What is claimed is:
1. A ceramic filter module for filtering a feed fluid, said module having a porous ceramic body with a circumferential surface extending in a lateral direction and comprising:
   a plurality of first passage holes permitting a feed fluid to pass through in said lateral direction;
   a plurality of internal passage holes, said internal passage holes being substantially parallel to said first passage holes and being sealed at inlet and outlet ends, said first passage holes and said internal passage holes being alternately arranged about a plurality of ceramic partitions of the porous ceramic body in respective rows or columns in a cross section normal to said lateral direction;
   a plurality of discharge holes for permeate discharge, said discharge holes traversing through ceramic partitions between adjacent internal passage holes and/or between an internal passage hole and the circumferential surface of the porous ceramic body;

wherein said porous ceramic body is composed of a porous silicon nitride ceramic body constituted of columnar silicon nitride particles having an average aspect ratio of at least 3 and an oxide binder phase, having a porosity of 30 to 70% an average pore diameter of $1\mu m$ or less, and a three-point bending strength of at least 100 MPa; and wherein said ceramic partition has a thickness of at most 1 mm.

2. The ceramic filter module according to claim 1, wherein said first passage holes and said internal passage holes have a triangular, quadrangular, hexagonal, circular, grid-like or slit-like form in section.

3. The ceramic filter module according to claim 1, wherein the sealed inlet and outlet ends of said internal passage holes are made of plastic, metal, or ceramic.

4. The ceramic filter module according to claim 1, wherein said passage holes and said internal passage holes are alternately arranged in rows or columns at a pitch of 1 to 3 mm between the rows or columns.

* * * * *